(12) United States Patent
Hayes et al.

(10) Patent No.: US 8,787,904 B1
(45) Date of Patent: Jul. 22, 2014

(54) AIRCRAFT BASED WIRELESS COMMUNICATION SYSTEM

(71) Applicant: Smartsky Networks LLC, Charlotte, NC (US)

(72) Inventors: Gerard James Hayes, Wake Forest, NC (US); Elbert Stanford Eskridge, Jr., Chapel Hill, NC (US)

(73) Assignee: Smartsky Networks LLC, Charlotte, NC (US)

( * ) Notice: Subject to any disclaimer, the term of this patent is extended or adjusted under 35 U.S.C. 154(b) by 0 days.

(21) Appl. No.: 13/796,763

(22) Filed: Mar. 12, 2013

(51) Int. Cl.
*H04W 4/00* (2009.01)

(52) U.S. Cl.
USPC ............... 455/431; 455/7; 455/9; 455/13.1; 370/316; 370/492

(58) Field of Classification Search
CPC .... H04B 7/18506; H04B 1/3838; H04B 1/00; H04B 1/0003; H04B 1/001; H04B 1/0039; H04B 1/0042; H04B 1/0057; H04B 1/0092; H04B 1/036; H04B 1/16; H04B 1/18; H04B 1/26; H04B 1/28; H04B 1/40; H04B 1/7163; H04B 2001/0491; H04W 56/009; H04W 4/02; H04W 84/06; H04W 4/12; H04W 52/0216; H04W 76/02; H04W 4/005; H04W 52/0229; H04W 84/005; H04W 84/042; H04W 12/08; H04W 24/00; H04W 40/02; H04W 4/043; H04W 4/22; H04W 52/0245; H04W 52/04; G07C 5/08; G07C 5/00; G07C 5/008; G07C 5/0808; G07C 5/085; G07C 5/0825; G07C 5/0858; H04L 2012/40273; H04L 41/00; H04L 67/12; H04L 12/5895; H04L 45/00; H04L 51/38; H04L 12/42; H04L 12/43; H04L 12/4625; H04L 12/4637; H04L 12/66; H04L 2012/40215; H04L 2012/4028; H04L 45/28
USPC ............... 340/573.1, 584, 936, 945; 342/353, 342/357.55, 361, 385, 386; 343/709, 776, 343/895; 455/12.1, 3.01, 3.02, 430, 431, 455/517, 90.2
See application file for complete search history.

(56) References Cited

U.S. PATENT DOCUMENTS

| | | | |
|---|---|---|---|
| 6,781,513 B1 * | 8/2004 | Korkosz et al. ............ 340/539.1 |
| 7,176,812 B1 * | 2/2007 | Kelley ......................... 340/946 |
| 2006/0183421 A1 * | 8/2006 | Proctor et al. ............... 455/11.1 |
| 2007/0194951 A1 * | 8/2007 | Thomson et al. ............ 340/945 |
| 2007/0280155 A1 * | 12/2007 | Le et al. ....................... 370/328 |
| 2010/0154512 A1 * | 6/2010 | Spinelli et al. ............... 73/29.01 |
| 2010/0186051 A1 * | 7/2010 | VonDoenhoff et al. ......... 725/76 |
| 2011/0199976 A1 * | 8/2011 | Mitchell et al. ............... 370/328 |
| 2011/0255528 A1 * | 10/2011 | Zakrzewski .................. 370/350 |
| 2013/0035090 A1 * | 2/2013 | Moshfeghi ................ 455/422.1 |

* cited by examiner

*Primary Examiner* — Golam Sorowar
(74) *Attorney, Agent, or Firm* — Nelson Mullins Riley & Scarborough LLP

(57) ABSTRACT

An aircraft may include an onboard wireless communication network. The network may include an access point disposed on the aircraft and at least one repeater station disposed spaced apart from the access point and capable of wireless communication with the access point or at least one remote sensor configured to wirelessly transmit information for delivery to the access point via a first wireless communication link. The at least one remote sensor may monitor at least one remote component of the aircraft and generating the information based on data indicative of an operational parameter or a status of the at least one remote component.

18 Claims, 5 Drawing Sheets

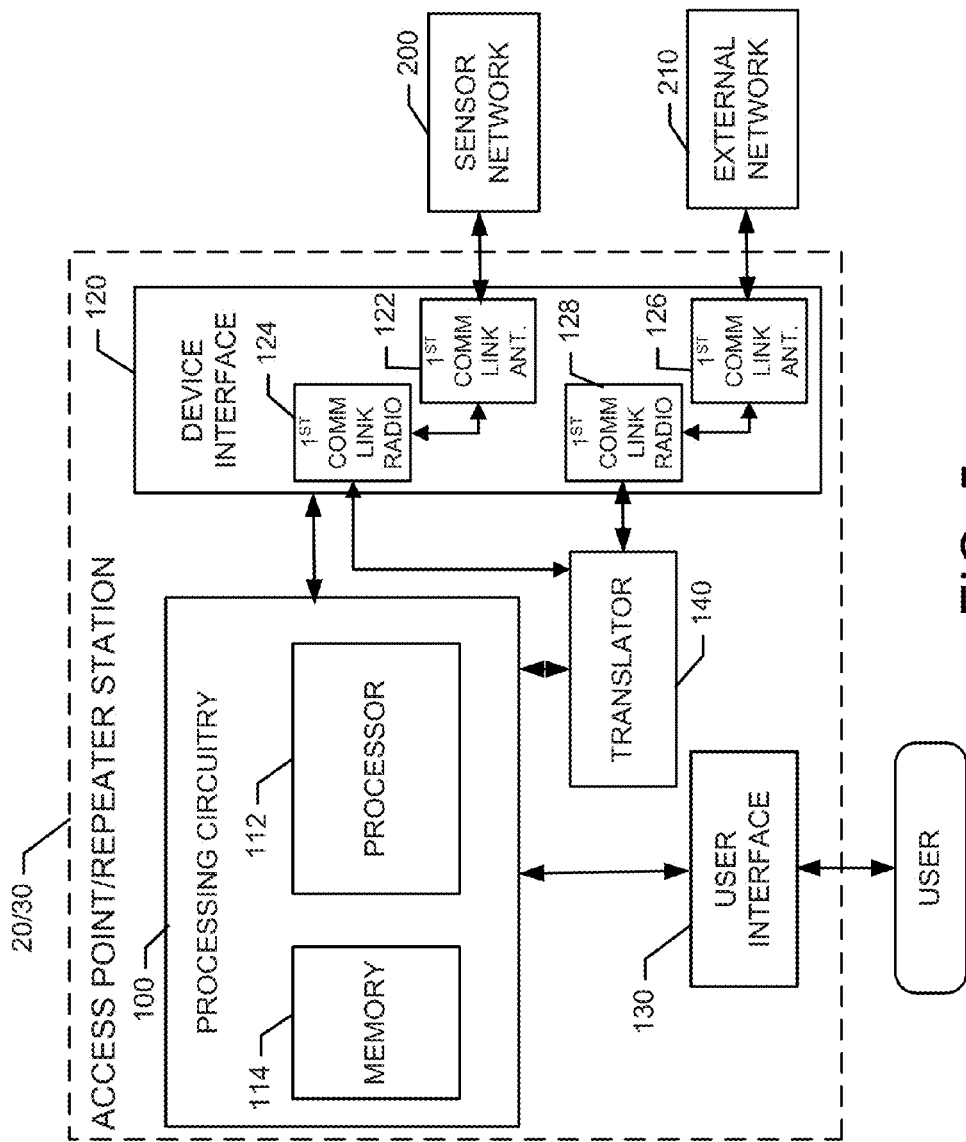

AIRCRAFT BASED WIRELESS COMMUNICATION SYSTEM

TECHNICAL FIELD

Example embodiments generally relate to wireless communications and, more particularly, relate to an onboard communication system for employment on an aircraft.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

Conventional communication systems throughout an aircraft (outside of the passenger cabin) are provided in a relatively rigid architecture at least in part because such systems typically include electrical cables and/or fiber optic links. These systems enable the transfer of vital information from the cockpit to external antennas and remote sensors that are distributed throughout the aircraft. The cable routes are typically designed into an aircraft's structure and manufactured with the original aircraft. Any post-manufacturing changes to the cable routes can require costly retro-fitting and (possibly) recertification of the aircraft. As a result, the physical infrastructure remains fixed with relatively little flexibility to adapt to new technologies and systems throughout the life an aircraft. Additionally, cables introduce line losses that can be substantial over relatively long cable runs.

BRIEF SUMMARY OF SOME EXAMPLES

The continuous advancement of wireless technologies offers new opportunities to provide more efficient and robust communications throughout the aircraft and with external (terrestrial or satellite) systems. For example, diversity or MIMO (multiple input multiple output) systems provide greater data rates and improved quality of service over single antenna solutions. In addition, advanced sensors are being developed that can, for example, remotely monitor atmospheric conditions, structural integrity, and detect fuel leaks. To up-fit an existing aircraft to take advantage of these improved technologies currently requires additional antennas and physical connectivity. Some example embodiments may provide a wireless communication system that links remote sensors, antennas, and communications links to be distributed throughout an aircraft without having to accommodate the re-routing of wires and/or fiber optic cables. Line losses from long cable runs can therefore also be avoided.

In one example embodiment, an aircraft is provided. The aircraft may include an onboard wireless communication network. The network may include an access point disposed on the aircraft and at least one repeater station disposed spaced apart from the access point and capable of wireless communication with the access point or at least one remote sensor configured to wirelessly transmit information for delivery to the access point via a first wireless communication link. The at least one remote sensor may monitor at least one remote component of the aircraft and generating the information based on data indicative of an operational parameter or a status of the at least one remote component.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 illustrates a functional block diagram of an access point or repeater station of an example embodiment.

DETAILED DESCRIPTION

Figure 1:
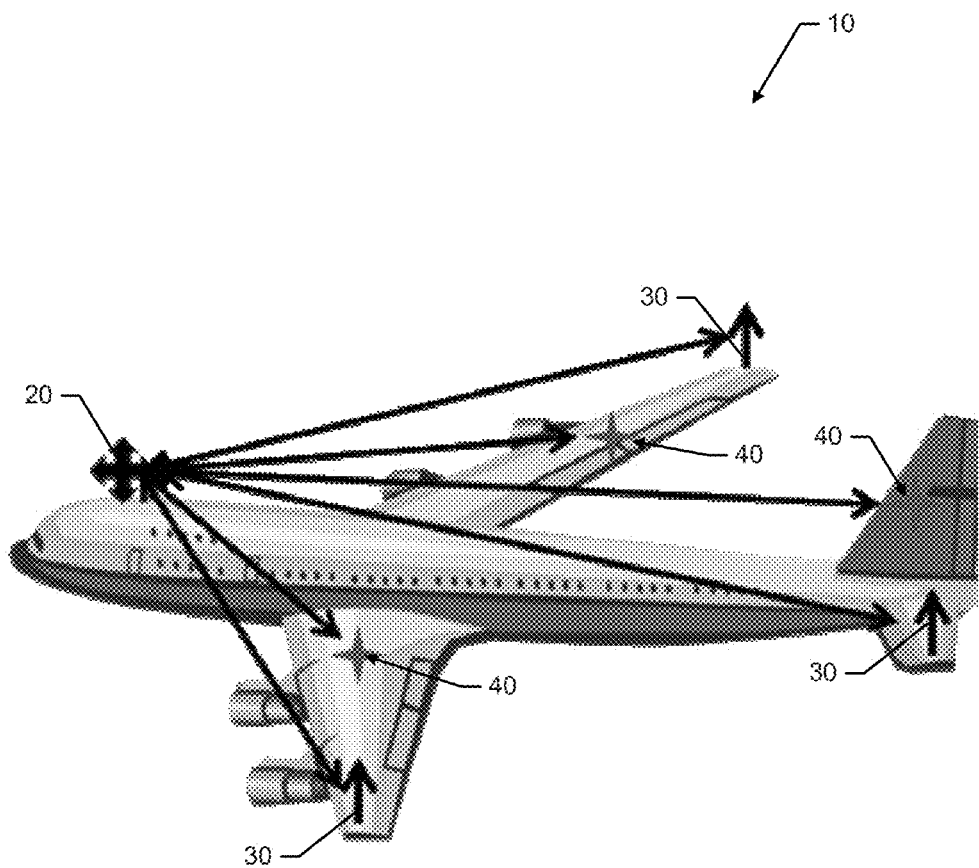
FIG. 1 illustrates a concept view of an aircraft that employs a wireless communication network of an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true.

Some example embodiments described herein provide architectures for improved aircraft wireless network performance. In this regard, some example embodiments may provide for an onboard communications network that enables remote sensors on the aircraft to wirelessly communicate data within the network. Some embodiments may further incorporate repeater stations that may consolidate communications from the remote sensors and pass such communications along to an access point of the network. In some cases, the repeater stations may further be configured to enable communications with ground based communication stations and/or satellites. In an example embodiment, the repeater stations and/or the access point may further be enabled to communicate with repeater stations and/or access points of other in-flight aircraft. Each of the communication links described may be separated using different channels of on air interface protocol, or by using separate air interface protocols. Accordingly, some example embodiments may enable substantially real time monitoring of airborne asset components and/or systems by ground based services. As such, "black box" type recording and/or real time tracking and monitoring of aircraft related operational parameters may be accomplished using ground based assets.

Figure 2:
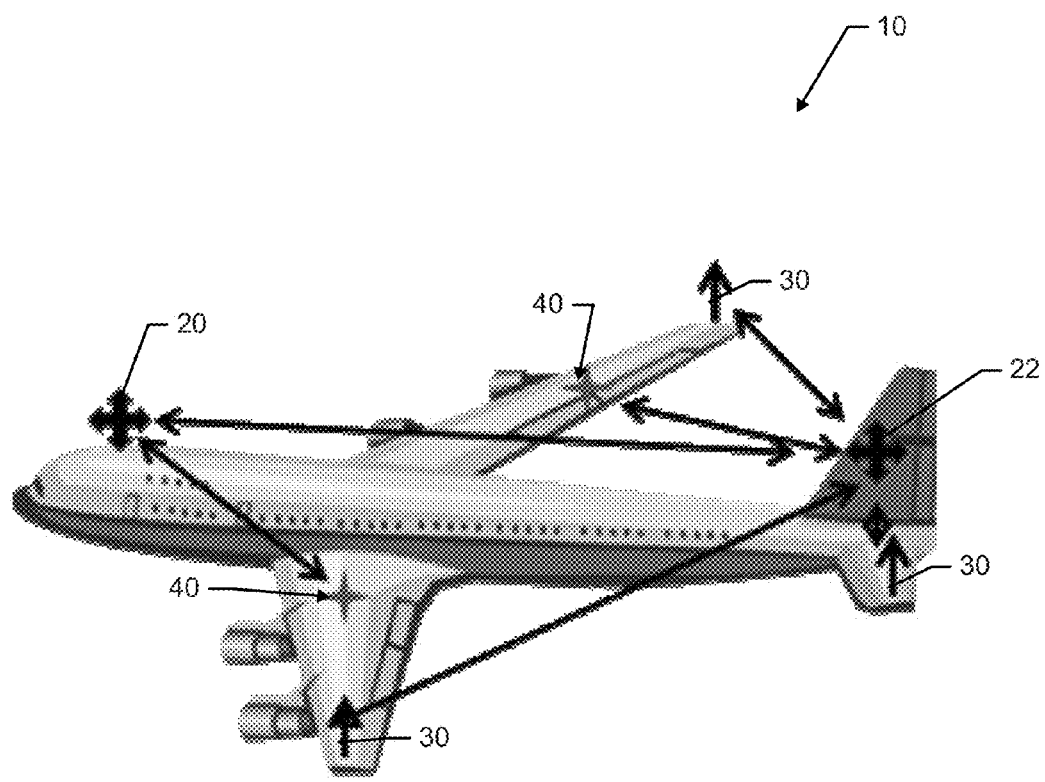
FIG. 2 illustrates the aircraft of FIG. 1 employing two access points in accordance with an example embodiment.

FIG. 1 illustrates a concept view of an aircraft 10 that employs a wireless communication network of an example embodiment. As shown in FIG. 1, the aircraft 10 may be a commercial airliner. However, it should be appreciated that the aircraft 10 could be a smaller plane as well. For example, the aircraft 10 could instead be embodied as a smaller craft or even an unmanned areal vehicle (UAV). Regardless of the specific size and structure of the aircraft 10, the aircraft 10 of example embodiments may include an access point 20 that may be disposed proximate to the cockpit of the aircraft 10. The communications stack comprising radios, control circuitry and/or the like for much of the communications equipment employed by the aircraft 10 is typically disposed proximate to the cockpit. Thus, it may be convenient to provide the access point 20 at or near the communications stack so that the access point 20 may be integrated into other communications systems of the aircraft 10 if desired. However, the access point 20 could alternatively be disposed at other locations. Moreover, in some cases, in order to provide optimal coverage to all areas of the aircraft 10 for which coverage is desired or needed, multiple access points 20 may be provided. FIG. 2 illustrates an example in which a rear section access point 22 is provided to provide optimal coverage for rear portions of the aircraft 10. However, it should be appreciated that the access points 20 could alternatively be provided on different levels or in different compartments on other aircraft designs.

The access point 20 (an example of which is shown in more detail in FIG. 5) may include one or more antennas for receiving wireless signals transmitted thereto. In some embodiments, the access point 20 may further include one or more antennas for transmitting wireless signals therefrom. However, as an alternative, the access point 20 may have a wired connection to other radio access technology components of the communications stack of the aircraft 10, or the same antennas used for receiving signals may also be used for transmission of outgoing signals. Thus, thee access point 20 may include radio circuitry corresponding to each air interface technology that is employed for communication via the antennas. In some cases, the access point 20 may further include control circuitry and user interface circuitry as further described in reference to FIG. 5 below. However, regardless of the specific architecture employed for the access point 20, the access point 20 may be configured to communicate with at least one or more repeater stations 30 and one or more wireless remote sensors 40.

The repeater stations 30 may be located at any convenient portion of the aircraft 10. However, given that ends of the wings and tips of tail features are often provided with power source connections to power things like aircraft lights or other components, the repeater stations 30 of one example embodiment may be located in wing tips and or tips of tail features. The repeater stations 30 may be configured to receive signals from a communication source and pass such signals along to the access point 20. In some embodiments, the communication source may provide the signals via a first communication protocol or channel, and the repeater stations 30 may translate the signals to a second communication protocol or channel for transmission to the access point 20. Thus, for example, the repeater stations 30 may receive component or environmental data and/or component status data from the remote sensors 40 via the first communication protocol or channel, and may translate the data received to the access point 20 via the second communication protocol or channel so that, for example, either interference can be avoided or different communication protocols and channels can be accommodated. Alternatively or additionally, as will be described in greater detail below, the repeater stations 30 may receive air-to-ground (ATG) communication signals from terrestrial communication systems, air-to-air communication signals from airborne communication systems, or satellite communication signals from space-based communication systems and may translate or repeat such communication signals (in the same or different communication protocols) to the access point 20.

The remote sensors 40 may include any number of sensors that may be configured to wirelessly communicate with the access point 20 and/or the repeater stations 30 to provide indications of data gathered at the remote sensors 40, or the status of components monitored by the remote sensors 40. Thus, for example, the remote sensors 40 may monitor fuel and hydraulic system fluid levels and pressures, the position of certain valves, switches or other components, atmospheric conditions, indicators of structural integrity, and/or the like. In the example of FIG. 1, the remote sensors 40 may be distributed to different locations that may be proximate to the respective components that are being monitored by respective ones of the remote sensors 40. The remote sensors 40 may each have at least a local transmitter to transmit data to the access point 20 and/or to the closest repeater station 30. In some cases, the remote sensors 40 may include transceivers to permit two way communications with the access point 20 and/or the repeater stations 30.

In an example embodiment, the access point 20 may be external to the fuselage of the aircraft 10. However, the access point 20 may alternatively be positioned within the fuselage of the aircraft 10. The remote sensors 40 and/or the repeater stations 30 may also be located either inside or outside of the fuselage dependent upon design considerations for respective different embodiments. The access point 20 and the repeater stations 30 may be powered from power cables of the aircraft 10 as part of the power distribution system of the aircraft 10. Dependent upon power requirements of the remote sensors 40, and corresponding design imperatives, the remote sensors 40 may either be powered by the power distribution system of the aircraft 10, or they may be powered by local power sources.

If local power sources are employed, the remote sensors 40 of some embodiments may be completely free of wired connection to other aircraft components. The combination of wireless communication capability with remote power provision may give a high degree of flexibility relative to the locations and designs of such sensors. In some cases, equipment could be installed with wireless sensors built therein, and the new sensors could be registered to the access point 20 to permit communication therewith either directly or via one of the repeater stations 30. Alternatively, such connection free sensors may be installed and/or replaced with relative ease, since no cable runs may need to be made to accommodate the new sensors. Moreover, some sensors could (e.g., sensors gathering environmental data) may be moved to any desirable location in an effort to find an optimal location for such sensors. As sensor technology improves, the remote sensors may be upgraded with improved sensors without requiring significant rework to the entire onboard communications network.

In some embodiments, the power sources for the sensors may be replaceable or rechargeable batteries (or capacitors). In the case of rechargeable batteries (or capacitors), the remote sensors 40 may employ or otherwise be in communication with one or more solar panels that may be disposed on top portions of the wings or fuselage of the aircraft 10. The solar panels may provide continuous or opportunistic charging of the rechargeable batteries (or capacitors).

Dependent upon the amount of power available at the remote sensors 40, and the environment in which they are disposed, the remote sensors 40 may have relatively limited communications ranges. Thus, some remote sensors 40 may transmit to the repeater stations 30 and the repeater stations 30 may repeat the transmissions for delivery to the access point 20. However, some of the remote sensors 40 may be capable of communication directly with the access point 20. The communication between remote sensors 40 and the access point 20 and/or the repeater stations 30 may be accomplished using any desirable air interface to form a first communication link aboard the aircraft 10. Thus, for example, the first communication link may employ WLAN 802.11b/g/n/a, Zigbee, Bluetooth, and/or the like. Alternatively, the first communication link may employ a proprietary communication protocol.

In some examples, the first communication link may be a one way link away from the remote sensors 40 to either or both of the access point 20 and the repeater stations 30. However, in alternative embodiments, the first communication link may be a two way communication link so that the repeater stations 30 and/or the access point 20 may query the remote sensors 40 to request data and/or status information relating to the remote sensors 40 themselves or related to the components or conditions that the remote sensors 40 monitor. Communications via the first communication link may be secured using encryption. In some cases, each one of the remote sensors 40 may have a unique identifier, or various groups of sensors may have identifiers indicative of group and/or function of the respective remote sensors 40 so that the access point 20 can distinguish between sensors and/or may address specific sensors or groups of sensors if desired. In some cases, various ones of the remote sensors 40 may be configured to report data in a given order or at predetermined intervals to facilitate differentiation between data received from respective ones of the remote sensors 40.

In some embodiments, the remote sensors 40 may communicate information to the repeater stations 30 or the access point 20 via the first communication link, and the repeater stations 30 or access point 20 may translate the information for communication via a second and different communication link. In an example embodiment, the repeater stations 30 may perform a translation between a first communication link and a second communication link to reach the access point 20, and the access point 20 may communicate the information received to a third communication link that may be different than the first and second communication links in order to pass the information on to another air asset or to terrestrial or space-based communication platforms. Accordingly, example embodiments may be configured to support communication and translation involving numerous different air interfaces and radio access technologies. Moreover, in some cases, the access point 20 may also enable communication with passengers on the aircraft via the same or different air interfaces or radio access technologies than those used for sensor based communication of information.

Accordingly, for example, customer premises equipment (CPE) such as a laptop, smartphone, tablet or other such device of a passenger or other third party may communicate with the access point 20 either directly or via the repeater stations 30. Moreover, in some cases, devices such as laptops, smartphones, tablets, or other CPE may further communicate with the access point 20 from outside of the aircraft 10 (e.g., such as when maintenance is being performed external to the aircraft 10). The second communication link (or the third communication link, if employed) may be a longer range air interface that may enable external communications. For example, the second (or third) communication link may employ long term evolution (LTE), wideband code division multiple access (WCDMA), global positioning system (GPS), WiMAX, and/or the like. However, example embodiments may be practiced in connection with any number of different frequencies and air interface protocols. Moreover, some embodiments may be practiced in connection with unlicensed communication bands (e.g., 2.4 GHz and 5.8 GHz), but any suitable frequencies may be employed.

Figure 3:
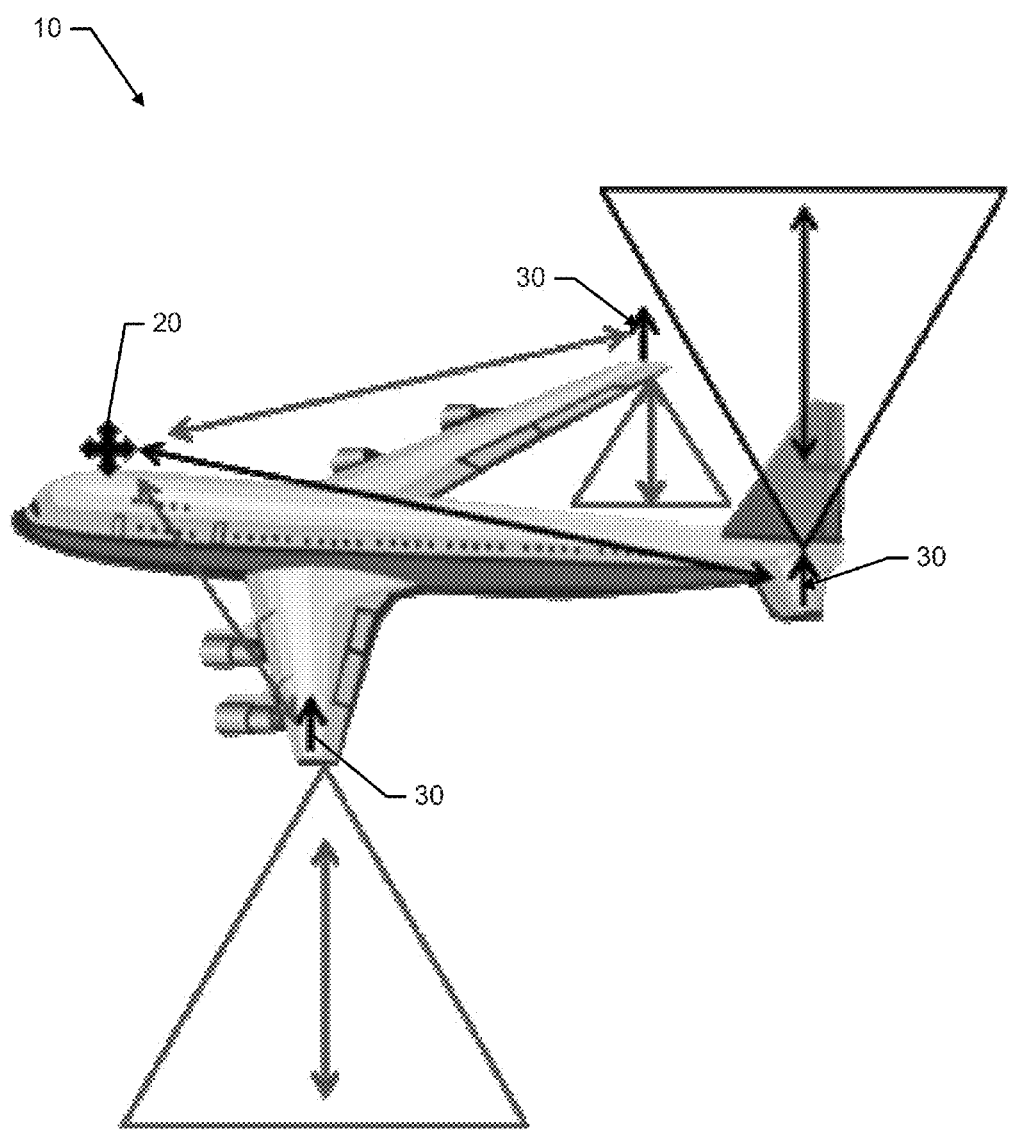
FIG. 3 illustrates a concept view of an aircraft configured to communicate with terrestrial and space-based external communications systems according to an example embodiment.

FIG. 3 illustrates an example in which the repeater stations 30 are configured to communicate external to the aircraft 10 according to an example embodiment. As shown in FIG. 3, at least one repeater station 30 disposed on the wing tips of the aircraft 10 may be configured to enable communication with terrestrial or ground based communication stations. Meanwhile, at least one repeater station 30 disposed at a tail section of the aircraft may be configured to enable communication with space-based communication stations (i.e., satellites). Information reported by the remote sensors 40 to the access point 20 may therefore be transferred external to the aircraft 10 via a long range and different communication link. In some embodiments, the information may be translated and communicated substantially in real time (e.g., within a few seconds of generation of the information). In this regard, the access point 20 of some embodiments may be in communication with or otherwise include memory that may act as a buffer for information. Thus, the information generated by the remote sensors 40 of some embodiments may be communicated external to the aircraft 10 subsequent to storage or buffering onboard the aircraft 10. However, the information of some embodiments may be simultaneously (or with minimal delay) read out of storage or the buffer for relatively immediate external communication. In still other embodiments, the information may be transmitted external to the aircraft 10 without any onboard storage or buffering. As indicated above, the information may be recorded and/or monitored (substantially in real time) by assets on the ground. Thus, for example, equipment on the ground may be enabled to engage in fault detection, identifying systems or components that are in need of repair, replacement or tuning, providing instructions for optimal operation based on current conditions, and/or the like while monitoring operational data and conditions of an in-flight aircraft.

Figure 4:
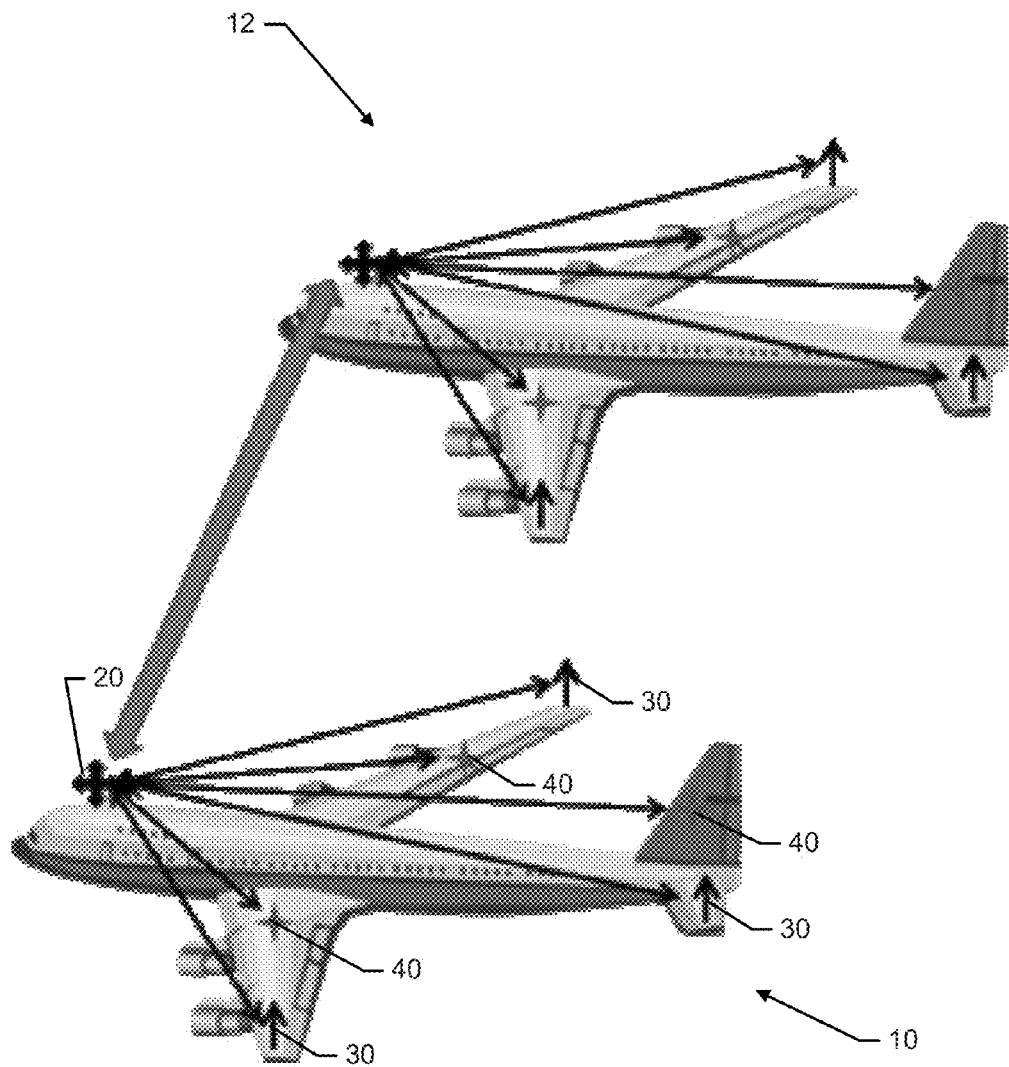
FIG. 4 illustrates two in-flight aircraft configured to share information via a communication link therebetween according to an example embodiment.

In some embodiments, transmission of information external to the aircraft 10 may be accomplished by transmitting data to another in-flight aircraft 12. FIG. 4 illustrates an example in which the access point 20 is configured to enable communication of data between two in-flight aircraft. However, it should be appreciated that the repeater stations 30 of some embodiments may also or alternatively be configured to facilitate communication between aircraft. The communication link between aircraft (e.g., the third communication link) may be different than the second communication link, or may be the same. However, it may be expected that the first communication link (i.e., the link onboard the aircraft 10 for short range communication of information gathered by the remote sensors 40) may be a short range wireless communication link and the second and/or third communication links may be longer range wireless communication links.

Given the ability of example embodiments to provide optimal coverage to all portions of the aircraft 10, and given also that multiple communication protocols can be supported by the access point 20 and the repeater stations 30, it should be appreciated that example embodiments essentially provide mobile and airborne pico cells that are configured to enable translation between multiple communication protocols. Thus, onboard communications associated with sensor network activity or passenger activity may be communicated to ground or satellite based assets or even other aircraft. Sensor data or passenger data from one aircraft may therefore be translated as appropriate and exchanged with another aircraft.

FIG. 5 illustrates a functional block diagram of an access point or repeater station of an example embodiment. In this regard, for example, the access point 20 or repeater station 30 may include processing circuitry 100 that may be configurable to perform control functions in accordance with example embodiments. The processing circuitry 100 may provide electronic control inputs to one or more functional units of the aircraft 10 and may process, analyze, record, translate, transmit, etc. data generated by sensors of a sensor network 200 (e.g., including remote sensors 40) regarding various data indicative of operational parameters or status of remotely located components of or relating to the aircraft 10. The processing circuitry 100 may be configured to perform data processing, control function execution and/or other processing and management services according to an example embodiment of the present invention.

In some embodiments, the processing circuitry 100 may be embodied as a chip or chip set. In other words, the processing circuitry 100 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 100 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 100 may include one or more instances of a processor 112 and memory 114 that may be in communication with or otherwise control a device interface 120 and, in some cases, a user interface 130. As such, the processing circuitry 100 may be embodied as a circuit chip (e.g., an integrated circuit chip) configured (e.g., with hardware, software or a combination of hardware and software) to perform operations described herein. However, in some embodiments, the processing circuitry 100 may be embodied as a portion of an on-board computer. In some embodiments, the processing circuitry 100 may control operation of a translator 140 that may be configured to translate information provided via communication with electronic components and/or sensors (e.g., of the sensor network 200) of the aircraft 10 via a first communication link (e.g., a short range communication network link) to a second communication link for communication with an external network 210.

The user interface 130 (if implemented) may be in communication with the processing circuitry 100 to receive an indication of a user input at the user interface 130 and/or to provide an audible, visual, mechanical or other output to the user. As such, the user interface 130 may include, for example, a display, one or more levers, switches, buttons or keys (e.g., function buttons), and/or other input/output mechanisms.

The device interface 120 may include one or more interface mechanisms for enabling communication with other devices (e.g., sensors of the sensor network 200 and/or the external network 210). In some cases, the device interface 220 may be any means such as a device or circuitry embodied in either hardware, or a combination of hardware and software that is configured to receive and/or transmit data from/to sensors or other devices in communication with the processing circuitry 100 via the translator 140. Thus, for example, the device interface 120 may provide interfaces for communication via different communication links. In an example embodiment, the communications with the sensor network 200 may be accomplished via a first communication link and the device interface 120 may include a corresponding first communication link antenna 122 and a first communication link radio 124. The processing circuitry 100 may be configured to control configuration or operation of the device interface 120 to facilitate operation of the first communication link antenna 122 and the first communication link radio 124. Communications with the external network 210 may be accomplished via a second communication link and the device interface 120 may include a corresponding second communication link antenna 126 and a second communication link radio 128. The processing circuitry 100 may be configured to control configuration or operation of the device interface 120 to facilitate operation of the second communication link antenna 126 and the second communication link radio 128.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 100) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 100) may be embodied as, include or otherwise control the operation of the access station 20 or repeater station 30 based on inputs received by the processing circuitry 100. As such, in some embodiments, the processor 112 (or the processing circuitry 100) may be said to cause each of the operations described in connection with the access station 20 or repeater station 30 in relation to operation of the access station 20 or repeater station 30 by directing the translator 140 and/or components of the device interface 120 to undertake the corresponding functionalities responsive to execution of instructions or algorithms configuring the processor 112 (or processing circuitry 100) accordingly.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the processing circuitry 100 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative, the memory 114 may include one or more databases that may store a variety of data sets responsive to input from the sensor network 200. Among the contents of the memory 114, applications may be stored for execution by the processor 112 in order to carry out the functionality associated with each respective application. In some cases, the applications may include instructions for recognition of various input signals related to component status or operational parameters and, if necessary, applying timing control, encryption, channel control and/or the like associated with handling the reception of such signals. The applications may further include instructions for operational control of the access station 20 or repeater station 30 as described above.

Accordingly, an example embodiment may provide an aircraft employing an onboard wireless communication network. The network may include an access point disposed on the aircraft and at least one repeater station disposed spaced apart from the access point and capable of wireless communication with the access point or at least one remote sensor configured to wirelessly transmit information for delivery to the access point via a first wireless communication link. The at least one remote sensor may monitor at least one remote component of the aircraft and generating the information based on data indicative of an operational parameter or a status of the at least one remote component.

In an example embodiment, the network may include additional, optional features, and/or the features described above may be modified or augmented. Each of the numbered modifications or augmentations below may be implemented independently or in combination with each other respective one of such modifications or augmentations, except where such combinations are mutually exclusive. Some examples of modifications, optional features and augmentations are described below. In this regard, for example, in some cases, (1) the at least one remote sensor may be configured to communicate directly with the access point via the first wireless communication link. In an example embodiment, (2) the at least one remote sensor may be configured to communicate with the at least one repeater station via the first wireless communication link, and the at least one repeater station may be configured to translate the information prior to transmission to the access point via a second communication link. In some cases, (3) the at least one remote sensor may be configured to communicate with the at least one repeater station via the first wireless communication link, and the at least one repeater station may be configured to transmit the information to the access point via the first communication link. In some example embodiments, (4) the at least one repeater station may be configured to communicate with a ground based communication station or a satellite communication station via a second wireless communication link. In an example embodiment, (5) the second wireless communication link may be employed to transmit the information from the at least one remote sensor to the ground based communication station or the satellite communication station substantially in real time. In some cases, (6) the access point may be configured to communicate with a different aircraft via a third wireless communication link. In some embodiments, (7) the at least one remote sensor may be powered via a local power source disposed proximate to the at least one remote sensor. The local power source may be a replaceable battery or a rechargeable battery. If the local power source is rechargeable, the rechargeable battery may be rechargeable via at least one solar cell disposed at a portion of a fuselage of the aircraft. In some embodiments, (8) the aircraft may be embodied as a commercial airliner or an unmanned aerial vehicle. In an example embodiment, (9) the network may further include a plurality of remote sensors and each of the remote sensors may be configured to wirelessly communicate with the access point. In such an example, each of the plurality of remote sensors may be associated with a respective unique identifier. In some embodiments, (10) the access point may be configured to translate the information from a communication protocol associated with the first communication link to a different communication protocol prior to transmitting the information from the aircraft via the different communication protocol. In an example embodiment, (11) the at least one repeater station may be configured to translate the information from a communication protocol associated with the first communication link to a different communication protocol prior to transmitting the information from the aircraft via the different communication protocol.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An aircraft comprising an onboard wireless communication network, the network comprising:
an access point disposed on the aircraft;
at least one repeater station disposed spaced apart from the access point and communication configured to wirelessly communicate with the access point; and
at least one remote sensor configured to wirelessly transmit information for delivery to the access point via the at least one repeater station over a first wireless communication link in a given order or at a predetermined intervals, the at least one remote sensor monitoring at least one remote component of the aircraft and generating the information based on data indicative of an operational parameter or a status of the at least one remote component,
wherein the first wireless communication link comprises a short range communication link from the at least one remote sensor to the access point or the at least one repeater station, and
wherein the at least one repeater station is configured to (i) pass the information from the at least one remote sensor to the access point via a second wireless communication link that is different than the first wireless communication link and (ii) translate the information from a communication protocol associated with the first communication link to a different communication protocol prior to transmitting the information from the aircraft to a ground based station or a satellite communication station via the different communication protocol, and wherein the network further comprises a plurality of remote sensors that are grouped based on location in the aircraft to communicate with a closest one of a plurality of repeater stations to report the information associated with each respective one of the remote sensors to the access point via a corresponding one of the plurality of repeater stations.

2. The aircraft of claim 1, wherein the at least one repeater station is configured to translate the information prior to transmission to the access point via the second wireless communication link.

3. The aircraft of claim 1, wherein the at least one repeater station is configured to communicate with a ground based communication station via the second wireless communication link.

4. The aircraft of claim 3, wherein the second wireless communication link is employed to transmit the information from the at least one remote sensor to the ground based communication station substantially in real time.

5. The aircraft of claim 4, wherein the access point is configured to communicate with a different aircraft via a third wireless communication link.

6. The aircraft of claim 1, wherein the at least one repeater station is configured to communicate with a satellite communication station via the second wireless communication link.

7. The aircraft of claim 6, wherein the second wireless communication link is employed to transmit the information from the at least one remote sensor to the satellite communication station substantially in real time.

8. The aircraft of claim 7, wherein the access point is configured to communicate with a different aircraft via a third wireless communication link.

9. The aircraft of claim 1, wherein the second wireless communication link is employed to transmit the information from the at least one remote sensor to a satellite communication station or ground based communication station, and wherein the access point is configured to communicate with a different aircraft via a third wireless communication link.

10. The aircraft of claim 1, wherein the at least one remote sensor or the at least one repeater station is powered via a local power source disposed proximate to a respective one of the at least one remote sensor or the at least one repeater station.

11. The aircraft of claim 10, wherein the local power source is a rechargeable battery or a replaceable battery.

12. The aircraft of claim 11, wherein the rechargeable battery is rechargeable via at least one solar cell disposed at a portion of a fuselage of the aircraft.

13. The aircraft of claim 1, wherein the aircraft is a commercial airliner or an unmanned aerial vehicle.

14. The aircraft of claim 1, wherein customer premises equipment is enabled to communicate with the access point to access information associated with the at least one remote sensor from within or outside of the aircraft.

15. The aircraft of claim 1, wherein the network further comprises a plurality of remote sensors, wherein each of the remote sensors is configured to wirelessly communicate with the access point.

16. The aircraft of claim 15, wherein each of the plurality of remote sensors is associated with a respective unique identifier.

17. The aircraft of claim 1, wherein the access point is configured to translate the information from a communication protocol associated with the first communication link to a different communication protocol prior to transmitting the information from the aircraft via the different communication protocol.

18. The aircraft of claim 1, wherein the first wireless communication link is a one way communication link.

* * * * *

UNITED STATES PATENT AND TRADEMARK OFFICE
CERTIFICATE OF CORRECTION

| | | |
|---|---|---|
| PATENT NO. | : 8,787,904 B1 | Page 1 of 1 |
| APPLICATION NO. | : 13/796763 | |
| DATED | : July 22, 2014 | |
| INVENTOR(S) | : Gerard James Hayes | |

It is certified that error appears in the above-identified patent and that said Letters Patent is hereby corrected as shown below:

In the Claims:

At column 10, Claim #1, line #51, "access point and communication configured" should read --access point and configured--

Signed and Sealed this
Twenty-fifth Day of November, 2014

Michelle K. Lee
*Deputy Director of the United States Patent and Trademark Office*